United States Patent
Park

(10) Patent No.: US 10,919,533 B2
(45) Date of Patent: Feb. 16, 2021

(54) VEHICLE CONTROL SYSTEM AND CONTROL METHOD THEREOF

(71) Applicant: MANDO CORPORATION, Gyeonggi-do (KR)

(72) Inventor: Byoung Jin Park, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 211 days.

(21) Appl. No.: 16/147,574

(22) Filed: Sep. 28, 2018

(65) Prior Publication Data

US 2019/0100213 A1 Apr. 4, 2019

(30) Foreign Application Priority Data

Sep. 29, 2017 (KR) .......................... 10-2017-0126791

(51) Int. Cl.
*B60W 30/18* (2012.01)

(52) U.S. Cl.
CPC ... *B60W 30/18172* (2013.01); *B60W 2520/26* (2013.01); *B60W 2520/28* (2013.01); *B60W 2552/35* (2020.02)

(58) Field of Classification Search
None
See application file for complete search history.

(56) References Cited

U.S. PATENT DOCUMENTS

| 4,760,893 | A | * | 8/1988 | Sigl | ......................... B60T 8/173 180/197 |
| 5,040,120 | A | * | 8/1991 | Hoffmann | ............... B60T 8/173 701/90 |
| 2001/0032046 | A1 | * | 10/2001 | Nada | ...................... B60W 10/08 701/82 |
| 2004/0098188 | A1 | | 5/2004 | Priemer et al. | |
| 2015/0232093 | A1 | * | 8/2015 | Fairgrieve | ............... B60T 8/175 701/90 |

FOREIGN PATENT DOCUMENTS

| KR | 10-2002-0067839 | 8/2002 |
| KR | 10-1664705 | 10/2016 |

\* cited by examiner

*Primary Examiner* — Jonathan M Dager
*Assistant Examiner* — Garrett F Evans
(74) *Attorney, Agent, or Firm* — Ladas & Parry, LLP

(57) ABSTRACT

A vehicle control system and a control method thereof are disclosed. The vehicle control system according to an embodiment includes an inputter configured to receive a wheel speed of a vehicle; and a controller configured to determine a wheel spin based on the wheel speed, determine whether the vehicle passes over a pothole based on the tendency of the wheel spin, and cancel engine traction control entry for a time corresponding to the wheel speed when it is determined that the vehicle passes over the pothole.

15 Claims, 9 Drawing Sheets

①

②

VEHICLE CONTROL SYSTEM AND CONTROL METHOD THEREOF

CROSS-REFERENCE TO RELATED APPLICATION(S)

This application is based on and claims priority under 35 U.S.C. § 119 to Korean Patent Application No. 10-2017-0126791, filed on Sep. 29, 2017 in the Korean Intellectual Property Office, the disclosure of which is incorporated by reference in its entirety.

BACKGROUND

1. Technical Field

Embodiments of the present disclosure relate to a vehicle control system and a control method thereof, and more particularly, to a vehicle control system and a control method thereof for performing attitude control of a vehicle.

2. Description of the Related Art

Generally, an electronic control system for efficiently preventing a slip phenomenon of a vehicle comprises an anti-lock brake system (ABS) for preventing wheel slippage during braking and a traction control system (hereinafter referred to as "TCS") for controlling an engine and a brake to prevent excessive wheel slippage when the vehicle is suddenly unintentionally accelerated or intentionally accelerated.

The TCS is a safety system that automatically controls the torque of the engine that drives the vehicle and the braking force of the brake, which is a braking device, when the vehicle is suddenly unintentionally accelerated or intentionally accelerated on slippery roads such as snowy roads and icy roads, and on asymmetric roads, preventing the wheels from slipping on the road surface and improving steering stability.

The TCS is also applied to a hybrid vehicle that uses an engine and a motor as a driving source for driving the vehicle, and excessive driving force is generated according to road surface conditions when the vehicle is suddenly unintentionally accelerated or intentionally accelerated, thereby reducing the torque of the engine and the motor when the wheels slip. The TCS control mainly includes engine control (and motor control) and brake control. In the brake control, the rotation speed of the wheels is detected. When the speed difference between the wheels exceeds a reference value, the brake hydraulic pressure may be controlled to increase the braking force applied to the wheels.

Further, in the engine control, when the slip phenomenon of the wheels occurs, the engine output may be reduced.

However, as illustrated in FIG. 1, when the vehicle passes over a pot-hole (hereinafter referred to as "pothole") on the road surface, a posture of the vehicle suddenly becomes unstable and the TCS control may be automatically entered. For example, when a rear-wheel drive vehicle passes over the pothole during forward driving, the wheel instantly rises off the ground, causing a wheel spin. In this case, since a front wheel is not a driving wheel in the rear-wheel drive vehicle, it is not sufficient enough to enter the engine traction control. However, when a rear wheel, which is the driving wheel, passes over the pothole, a large wheel spin occurs, and as the engine traction control is entered, a lamp may blink in a cluster indicating that the engine torque is reduced and a driver is in control.

However, when unnecessary TCS control is entered according to the road surface condition, there is a problem in that the engine torque is unnecessarily reduced and the driver is forced to perform undesired driving control. That is, there is a problem in that the TCS control is performed even though the TCS control entry can be prevented by grasping the characteristics of the road surface through the information of the wheel, when the front wheel passes over the pothole during forward travel or the rear wheel passes over the pothole during backward driving.

PRIOR ART DOCUMENT

Patent Document

Korean Patent Application Publication No. 10-2002-0067839

SUMMARY

Therefore, it is an aspect of the present disclosure to prevent the unnecessary entry of TCS.

Additional aspects of the disclosure will be set forth in part in the description which follows and, in part, will be obvious from the description, or may be learned by practice of the disclosure.

In accordance with an aspect of the present disclosure, a vehicle control system includes: an inputter configured to receive a wheel speed of a vehicle; and a controller configured to determine a wheel spin based on the wheel speed, determine whether the vehicle passes over a pothole based on the tendency of the wheel spin, and cancel engine traction control entry for a time corresponding to the wheel speed when it is determined that the vehicle passes over the pothole.

The controller may determine the wheel spin based on the wheel speed and prematurely release the engine traction control upon passage over the pothole after the engine traction control entry based on the tendency of the wheel spin.

The controller may determine whether the vehicle passes over the pothole based on the tendency of the wheel spin of a front wheel during forward travel of the vehicle, and then cancel the engine traction control entry for the time corresponding to the wheel speed when it is determined that a rear wheel passes over the pothole.

The controller may determine whether the vehicle passes over the pothole based on the tendency of the wheel spin of a rear wheel during backward travel of the vehicle, and then cancel the engine traction control entry for the time corresponding to the wheel speed when it is determined that a front wheel passes over the pothole.

The controller may prematurely release the engine traction control when it is determined that the vehicle passes over the pothole based on the wheel spin of a rear wheel after the engine traction control entry based on the tendency of the wheel spin of a front wheel, or when it is determined that the vehicle passes over the pothole based on the tendency of the wheel spin of the front wheel after the engine traction control entry based on the wheel spin of the rear wheel.

The controller may prematurely release the engine traction control by increasing the engine torque increase rate.

The controller may prematurely release the engine traction control by increasing the engine torque increase rate after reducing the engine torque to a minimum upon passage over an additional pothole after the engine traction control entry.

The controller may determine that the vehicle is passing over the pothole when the tendency of the wheel spin formed within a predetermined time is obtained by a sudden increase and decrease of the wheel spin inclination.

In accordance with another aspect of the present disclosure, a vehicle control method includes: receiving a wheel speed of a vehicle; determining a wheel spin based on the wheel speed; determining whether the vehicle passes over a pothole based on the tendency of the wheel spin; and cancelling engine traction control entry for a time corresponding to the wheel speed when it is determined that the vehicle passes over the pothole.

The method may further include: prematurely releasing the engine traction control upon passage over the pothole after the engine traction control entry based on the tendency of the wheel spin.

The cancelling of the engine traction control entry for the time corresponding to the wheel speed when it is determined that the vehicle passes over the pothole may include determining whether the vehicle passes over the pothole based on the wheel spin of a front wheel during forward travel of the vehicle and then cancelling the engine traction control entry for the time corresponding to the wheel speed when it is determined that a rear wheel passes over the pothole or determining whether the vehicle passes over the pothole based on the wheel spin of the rear wheel during backward travel of the vehicle, and then cancelling the engine traction control entry for the time corresponding to the wheel speed when it is determined that the front wheel passes over the pothole.

The prematurely releasing of the engine traction control upon passage over the pothole after the engine traction control entry based on the tendency of the wheel spin may include prematurely releasing the engine traction control when it is determined that the vehicle passes over the pothole based on the wheel spin of a rear wheel after the engine traction control entry based on the tendency of the wheel spin of a front wheel, or when it is determined that the vehicle passes over the pothole based on the tendency of the wheel spin of the front wheel after the engine traction control entry based on the wheel spin of the rear wheel.

The method may further include: prematurely releasing the engine traction control by increasing the engine torque increase rate.

The method may further include: prematurely releasing the engine traction control by increasing the engine torque increase rate after reducing the engine torque to a minimum upon passage over an additional pothole after the engine traction control entry.

The determining of whether the vehicle passes over the pothole based on the tendency of the wheel spin may include determining that the vehicle is passing over the pothole when the tendency of the wheel spin formed within a predetermined time is obtained by a sudden increase and decrease of the wheel spin inclination.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
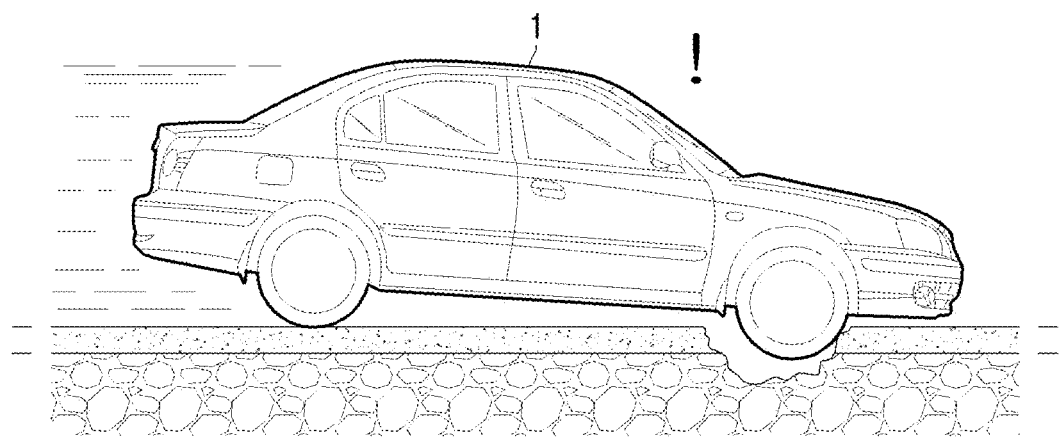
FIG. 1 is a schematic view illustrating a situation occurring when a vehicle passes over a pothole on a road.

Hereinafter, embodiments of the present disclosure will be described in detail with reference to the accompanying drawings. The embodiments to be described below are provided to fully convey the spirit of the present disclosure to those skilled in the art. The present disclosure is not limited to the embodiments disclosed herein and may be implemented in other forms. In the drawings, some portions not related to the description will be omitted and not be shown to clearly describe the present disclosure, and sizes of components may be somewhat exaggerated to facilitate understanding.

Figure 2:
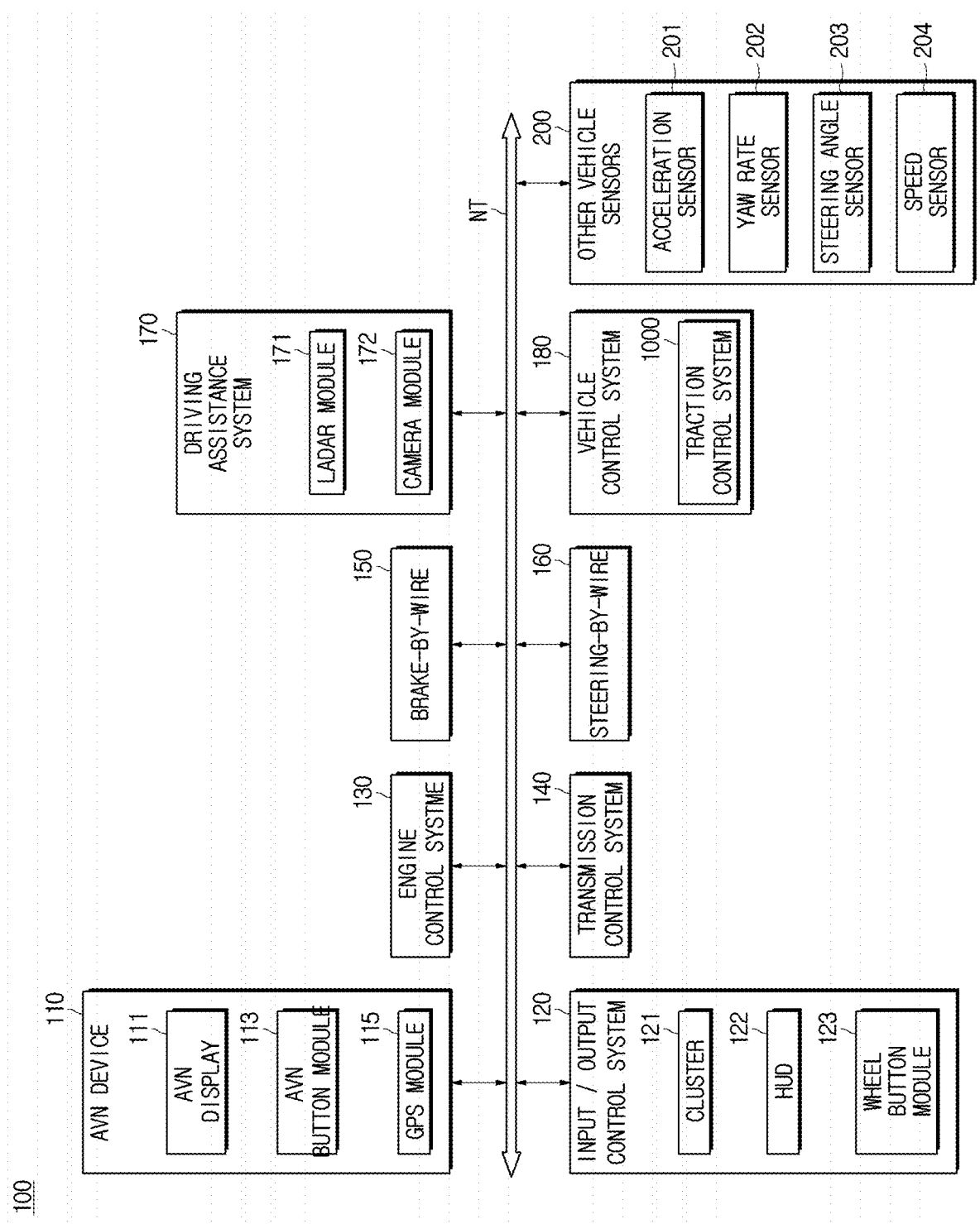
FIG. 2 is a block diagram illustrating various electronic devices embedded in a vehicle equipped with a vehicle control system according to an embodiment.

FIG. 1 is a schematic view illustrating a situation occurring when a vehicle passes over a pothole on a road, and FIG. 2 is a block diagram illustrating various electronic devices embedded in a vehicle equipped with a vehicle control system according to an embodiment.

As illustrated in FIG. 1, the present disclosure will be described with reference to a control method in a case where a posture of a vehicle becomes unstable when passing over a pothole while the vehicle is driving forward or backward, and a traction control is entered. However, the present disclosure is not limited to the case where the vehicle passes over the pothole, and the pothole is described in an embodiment. In a similar situation, a vehicle control system and a control method thereof according to the present disclosure may be applied.

Thus, a vehicle 1 including a vehicle control system 180 according to the embodiment may include various electronic devices 100, as illustrated in FIG. 2.

In particular, as illustrated in FIG. 2, the vehicle 1 may include an audio/video/navigation (AVN) device 110, an input/output control system 120, an engine management system (EMS) 130, a transmission control system (TMS) 140, a brake-by-wire 150, a steering-by-wire 160, a driving assistance system 170, the vehicle control system 180, other vehicle sensors 200, and the like.

However, the electronic device 100 illustrated in FIG. 2 is only one of the various electronic devices embedded in the vehicle 1, and the vehicle 1 may be provided with additional various electronic devices.

In addition, the various electronic devices 100 embedded in the vehicle 1 may communicate with each other through a vehicle communication network (NT). The vehicle communication network (NT) may be a media oriented systems transport (MOST) having a communication speed of up to 24.5 Mbps (Mega-bits per second), a FlexRay having a communication speed of up to 10 Mbps, a controller area network (CAN) having a communication speed of 125 kbps (kilo-bits per second) to 1 Mbps, and a local interconnect network (LIN) having a communication speed of up to 20 kbps. Such vehicle communication network (NT) may employ not only a single communication protocol such as the MOST, the FlexRay, the CAN, and the LIN but also a plurality of communication protocols.

The AVN device 110 may be an apparatus configured to output music or an image according to a control command of a driver. In particular, the AVN device 110 may reproduce the music or moving images according to the control command of the driver or guide a path to a destination received from a navigation system (not shown).

The AVN device 110 may include an AVN display 111 configured to display the image to the driver, an AVN button module 113 configured to receive the control command of the driver, and a global positioning system (GPS) module 115 configured to acquire geographical location information of the vehicle 1. Here, the AVN display 111 may employ a touch-sensitive display (e.g., a touch screen) capable of receiving the driver's touch input. The AVN display 111 may employ a liquid crystal display (LCD) panel or an organic light emitting diode (OLED) panel.

The GPS module 115 may also receive information for calculating the position of the vehicle 1 from GPS satellites and may determine the position of the vehicle 1 based on the information received from the GPS satellites.

The input/output control system 120 may receive the driver's control command through the button and display information corresponding to the driver's control command. The input/output control system 120 may include a cluster display 121 provided on the dashboard for displaying the image, a head-up display 122 for projecting the image onto a windscreen, and a wheel button module 123 installed on a steering wheel.

The cluster display 121 may be provided on the dashboard to display the image. Particularly, the cluster display 121 may be provided adjacent to the windscreen so that a driver U can be informed of operation information of the vehicle 1, information on a road, or a driving path of the vehicle 1 in a state in which the driver's line of sight does not deviate greatly from the front of the vehicle 1. The cluster display 121 may employ the LCD panel or the OLED panel, and the like.

The head-up display 122 may project the image onto the windscreen. In particular, the image projected onto the windscreen by the head-up display 122 may include the operation information of the vehicle 1, the information on the road, or the driving path.

Therefore, an operation state of the vehicle control system 180 may be shown through the input/output control system 120 so that the driver can confirm the operation state.

The engine management system 130 may perform a fuel injection control, a fuel ratio feedback control, a lean burn control, an ignition timing control, an idling control, and the like. The engine control system 130 may be a single device, or may be a plurality of devices connected through communication.

The transmission control system 140 may perform a transmission point control, a damper clutch control, a pressure control at the time of friction clutch on/off, and an engine torque control during transmission. The transmission control system 140 may be a single device, or may be a plurality of devices connected through communication.

The brake-by-wire 150 may control the braking of the vehicle 1 and may typically include an anti-lock brake system (ABS) or the like.

The steering-by-wire 160 may assist a steering operation of the driver by reducing the steering force during low-speed driving or parking and by increasing the steering force during high-speed driving.

The driving assistance system 170 may assist the driving of the vehicle 1 and may perform a forward collision avoiding function, a lane departure warning function, a blind spot monitoring function, a rearward monitoring function, and the like.

Such the driving assistance system 170 may include a plurality of devices connected through communication. For example, the driving assistance system 170 may include a forward collision warning system (FCW) for detecting a driving vehicle in the same direction in front of the driving lane and avoiding a collision with a forward vehicle, an advanced emergency braking system (AEBS) that mitigates the impact when a collision of the forward vehicle is inevitable, an adaptive cruise control (ACC) that detects the vehicle in the same direction in front of the driving lane and automatically accelerates/decelerates according to the speed of the forward vehicle, a lane departure warning system (LDWS) that prevents the vehicle from departing from the driving lane, a lane keeping assist system (LKAS) that controls the LKAS to return to the main lane when it is determined that the lane departs from the driving lane, a blind spot detection (BSD) that provides the driver with information about the vehicle located in a blind spot, and a rear-end collision warning system (RCW) that detects the vehicle driving in the same direction behind the driving lane and avoids an impulse with a rearward vehicle.

The driving assistance system 170 may include a radar module 171 configured to detect the positions of the forward and rearward vehicles, and a camera module 172 configured to acquire images of the forward and rearward vehicles. In particular, the radar module 171 may be used in apparatuses that operate according to the positions of the forward and rearward vehicles, such as the forward collision warning system (FCW), the advanced emergency braking system (AEBS), the adaptive cruise control (ACC), the blind spot detection (BSD), and the rear-end collision warning system (RCW). In addition, the camera module 172 may be used in apparatuses that operate according to the forward and rearward vehicles and the image of the road, such as the lane departure warning system (LDWS) and the lane keeping assist system (LKAS).

The vehicle control system 180 according to the embodiment may include a traction control system 1000. The traction control system 1000 may control the engine and the brake in order to prevent excessive wheel slippage at the time when the vehicle is suddenly unintentionally accelerated or intentionally accelerated. The traction control system 1000 may transmit a control signal to the brake-by-wire 150 included in the various electronic devices of the vehicle 1 under the control of the brake and may transmit the control signal to the engine management system 130 included in the various electronic devices of the vehicle 1 under the control of the engine.

The vehicle control system 180 will be described later with reference to an internal block diagram of the vehicle control system according to the embodiment of FIG. 3.

Next, the other vehicle sensors 200 may be included in the vehicle 1 and may include an acceleration sensor 201, a yaw rate sensor 202, a steering angle sensor 203, a speed sensor 204, and the like to sense the driving information of the vehicle 1.

The acceleration sensor 201 may measure the acceleration of the vehicle and may include a lateral acceleration sensor (not shown) and a longitudinal acceleration sensor (not shown). The yaw rate sensor 202 may be installed on each wheel of the vehicle 1 and may detect the yaw rate value in real time. The steering angle sensor 203 may be mounted on the lower end portion of a steering wheel 60, and may detect the steering speed, the steering direction and the steering angle of the steering wheel 60. The speed sensor 204 may be installed inside the wheel of the vehicle 1 to detect the rotational speed of the vehicle wheel.

The configuration of the vehicle 1 has been described above.

The configuration and operation of the vehicle control system 180 included in the vehicle 1 will be described below.

Figure 3:
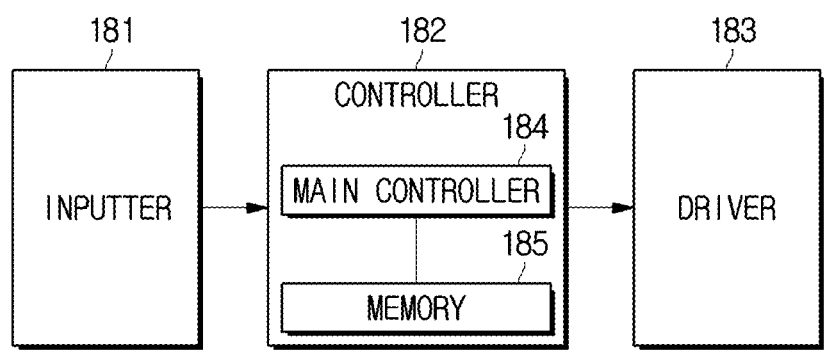
FIG. 3 is a block diagram of the vehicle control system according to an embodiment.

First, as illustrated in FIG. 3, the vehicle control system 180 according to the present disclosure may include an inputter 181 configured to receive sensor values from various sensors included in the other vehicle sensors 200 in the various electronic devices 100 included in the vehicle 1, a controller 182 configured to determine whether wheel slippage has occurred in the front or rear wheels by acquiring the sensor values of the inputter 181 and determine whether traction control is required, and a driver 183 configured to perform engine traction control of the vehicle 1.

At this time, the controller 182 may include a main processor 184 configured to determine whether the vehicle 1 needs to perform the engine traction control and calculate the control signal accordingly, and a memory 185 configured to store various control signals and control methods.

The memory 185 may include volatile memory to temporarily store data while power is supplied such as Static Random Access Memory (S-RAM) and Dynamic Random Access Memory (D-RAM) and non-volatile memory to store data even if the power supply is interrupted such as Read Only Memory (ROM) and Erasable Programmable Read Only Memory (EPROM).

The memory 185 may store various data necessary for the operation of the main processor 184 and may include not only volatile memory such as Static Random Access Memory (S-RAM) and Dynamic Random Access Memory (D-RAM) but also non-volatile memory such as flash memory, Read Only Memory (ROM), Erasable Programmable Read Only Memory (EPROM), and electrically erasable programmable read only memory (EEPROM).

The non-volatile memory may semi-permanently store control programs and control data for controlling the operation of the vehicle control system 180. The volatile memory may temporarily store control programs and control data from the non-volatile memory and may temporarily store various sensor information and various control signals output from the main processor.

Hereinafter, the inputter 181, the controller 182, and the driver 183 of the vehicle control system 180 according to the embodiment will be described in detail.

First, the inputter 181 may receive sensor values from the other vehicle sensors 200 of the vehicle. In particular, the inputter 181 may receive the acceleration of the vehicle from the acceleration sensor 201, the yaw rate of the vehicle from the yaw rate sensor 202, the steering angle from the steering angle sensor 203, and the speed from the speed sensor 204. However, the present disclosure is not limited thereto, and sensor values of various sensors included in the vehicle 1 may be acquired.

Therefore, the main processor 184 may determine whether or not the wheel slippage of the vehicle 1 has occurred, based on the sensor values of various sensors input to the inputter 181.

As an example, the main processor 184 may determine whether a wheel spin has occurred in the front wheel or the rear wheel based on the vehicle speed and acceleration information. In particular, the main processor 184 may detect the wheel spin that occurs when the front wheel instantaneously emerges off the ground when the rear-wheel drive vehicle passes over the pothole during forward travel, or may detect the wheel spin that occurs when the rear wheel instantaneously emerges off the ground when the front-wheel drive vehicle passes over the pothole during the backward driving. That is, the main processor 184 may determine whether the wheel spin has occurred in the current driving state of the vehicle.

Accordingly, the main processor 184 may determine the state of the road surface through the wheel spin information. For example, the main processor 184 may determine whether there is a pothole on the road surface through the wheel spin information.

Further, the main processor 184 may predict the spin information of the rear wheel (during forward travel) or the front wheel (during backward driving) in which the wheel spin has not yet occurred based on the generated wheel spin information.

As an example, the forward (D-stage) driving situation of the rear-wheel drive vehicle will be described.

The main processor 184 may predict the pothole passage time (a [sec]) of the rear wheel based on the vehicle speed inputted through the inputter 181 when the wheel spin occurs due to the front wheel passing over the pothole in the forward travel state of the rear-wheel drive vehicle.

At this time, when the wheel spin generated in the front wheel is lower than the target spin state, the main processor 184 may not enter the traction control.

Further, if the main processor 184 determines that the rear wheel passes over the pothole within a [sec], it may typically extend the threshold time at which the target spin state of the traction control entry condition is maintained. That is, if the main processor 184 performs the torque reduction control according to the entry of the engine traction control when the target spin state of the traction control entry condition is maintained for a1 [sec], then when the pothole is passed, a2 [sec], the control signal is calculated so that the engine traction control is entered when the target spin state is maintained. Thus, the main processor 184 may prevent unnecessary traction control as the vehicle 1 extends the target spin holding state of engine traction control entry when the vehicle 1 passes over the pothole.

As another example, the backward (R-stage) driving situation of the front-wheel drive vehicle will be described.

The main processor 184 may predict the pothole passage time (b [sec]) of the front wheel based on the vehicle speed inputted through the inputter 181 when the wheel spin occurs due to the rear wheel passing over the pothole in the backward driving state of the front-wheel drive vehicle.

At this time, when the wheel spin generated in the rear wheel is lower than the target spin state, the main processor 184 may not enter the traction control.

Further, if the main processor 184 determines that the front wheel passes over the pothole within b [sec], it may typically extend the threshold time at which the target spin state of the traction control entry condition is maintained. That is, if the main processor 184 performs the torque reduction control according to the entry of the engine traction control when the target spin state of the traction control entry condition is maintained for b1 [sec], then when the pothole is passed, b2 [sec], the control signal is calculated so that the engine traction control is entered when the target spin state is maintained. Thus, the main processor 184 may prevent unnecessary traction control as the vehicle 1 extends the target spin holding state of the engine traction control entry when the vehicle 1 passes over the pothole.

As another example, the forwarding situation of the four-wheel drive vehicle will be described.

The main processor 184 may predict the pothole passage time (c [sec]) of the rear wheel based on the vehicle speed inputted through the inputter 181 when the wheel spin occurs due to the front wheel passing over the pothole in the forward travel state of the four-wheel drive vehicle.

At this time, when the wheel spin generated in the front wheel is larger than the target spin state, the main processor 184 may enter the traction control. That is, the main processor 184 may perform engine torque reduction control.

However, if the main processor 184 determines that the rear wheel passes over the pothole within c [sec], the rear wheel may perform by reducing the engine traction control on the spin generated when passing over the pothole, thereby performing the reduction. Further, when the main processor 184 determines that the rear wheel is passing over the pothole, it may steadily increase the reduced engine torque for the engine traction control early release.

Figure 4:
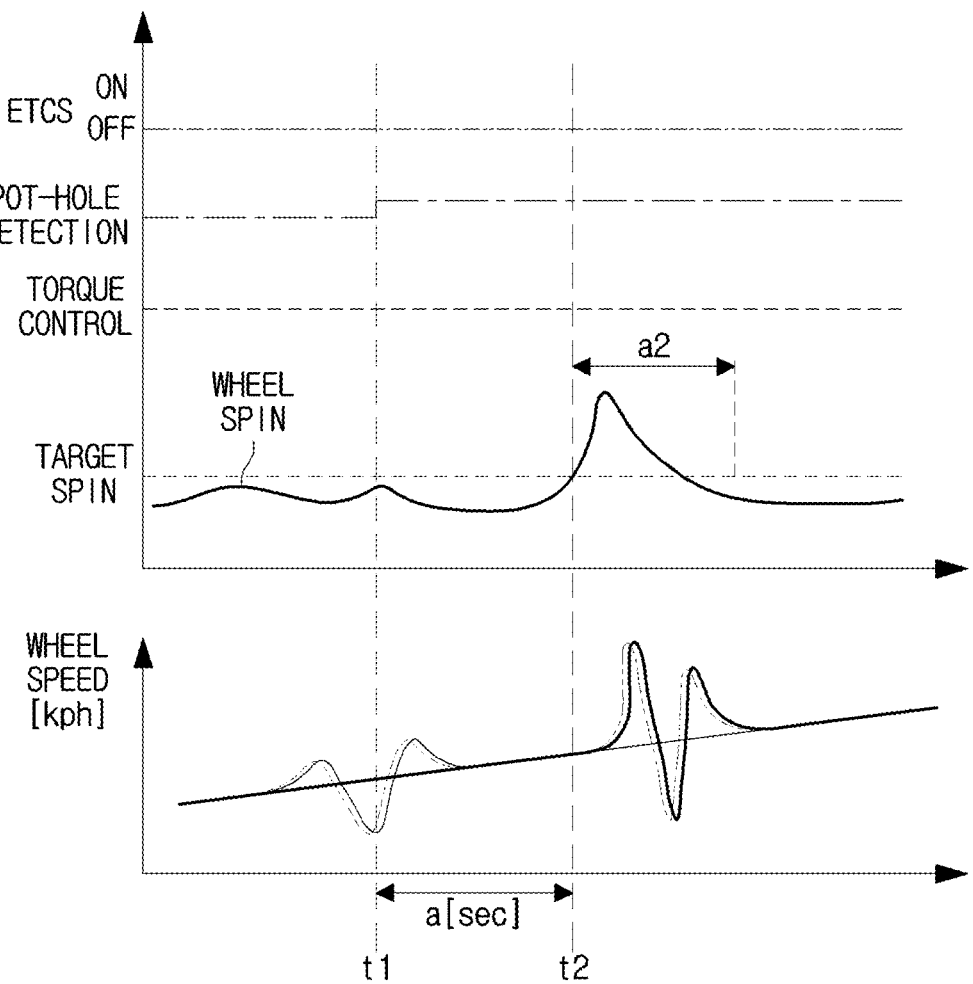
FIG. 4 is a graph for explaining a traction control method when a two-wheel drive vehicle passes over a pothole according to an embodiment.

FIG. 4 is a graph for explaining a traction control method when a two-wheel drive vehicle passes over the pothole according to an embodiment.

The two-dot chain line at the top of FIG. 4 illustrates the ON and OFF operation of the engine traction control, the one-dot chain line indicates whether the pothole is detected, the dotted line indicates the torque control, and the thick solid line indicates the wheel spin.

The bottom of FIG. 4 illustrates the wheel speed over time, the thin solid line indicates the speed of a right front wheel FR, the dotted line indicates the speed of a left front wheel FL, the thick solid line indicates the speed of a right rear wheel RR, and the two-dot chain line indicates the speed of a left rear wheel RL.

For example, FIG. 4 illustrates a state in which, during the forward travel of the rear-wheel drive vehicle equipped with the vehicle control system 180 according to the present disclosure, even if the spin generated at the front wheel during forward the travel is smaller than the target spin to which the traction control can enter, the control signal is calculated so as to enter the engine traction control if the target spin state is maintained for a2 [sec] when it is determined that the rear wheel passes over the pothole within a predetermined a [sec] from time point t1 [sec].

Therefore, as illustrated in FIG. 4, when the target spin state is not maintained for a2 [sec], the main processor 184 may determine that the vehicle posture is disturbed due to pothole passing and control not to enter the engine traction control.

At this time, it is possible to determine whether the main processor 184 has detected the pothole based on the tendency of the wheel spin. In particular, as illustrated in FIG. 5, a portion ① where the wheel spin of the front wheel increases rapidly occurs when the front wheel is caused to rise in the air due to entry into the pothole during the forward traveling of the rear-wheel drive vehicle, and a portion ② where the wheel spin decreases rapidly occurs when the front wheel touches the road surface after passing over the pothole.

Figure 5:
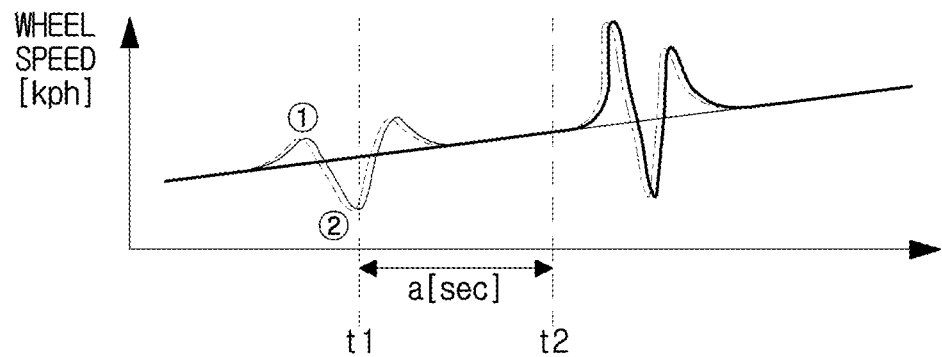
FIG. 5 is a schematic view for explaining position of a wheel and the tendency of wheel spin when a two-wheel drive vehicle passes over a pothole according to an embodiment.
Figure 5:
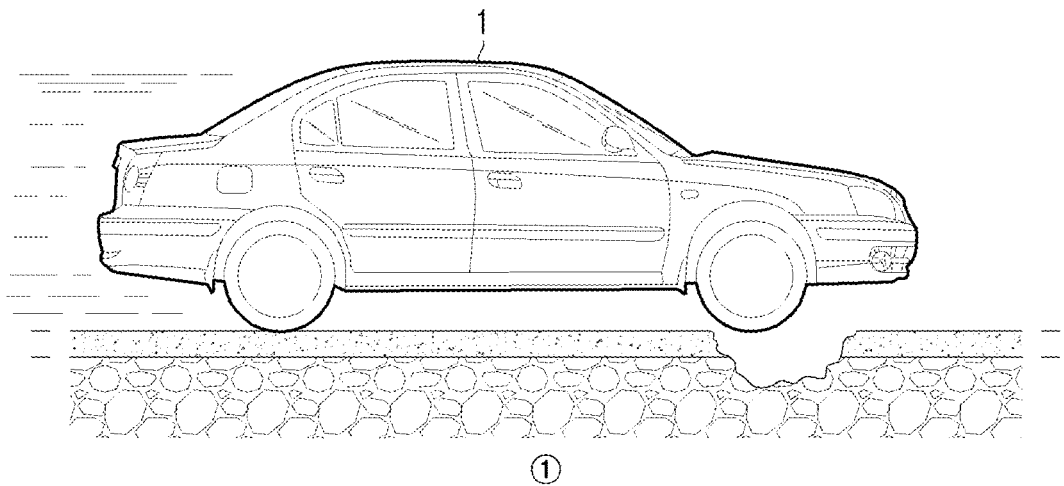
Figure 5:
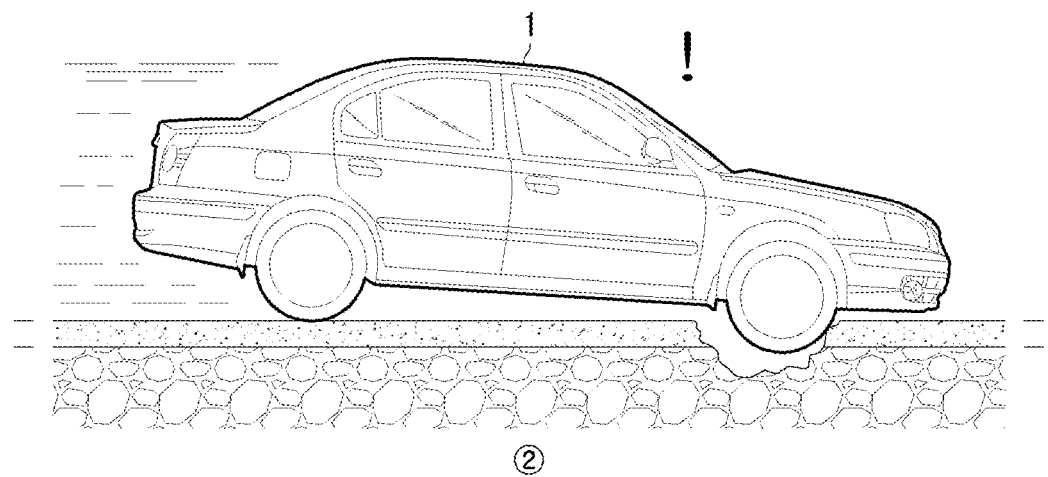

That is, as illustrated in FIG. 5, the wheel spin rapidly increases when the front wheel enters the pothole, and the wheel spin tends to be reduced in the form of rapidly decrease in the wheel spin when the front wheel touches the road surface after passing over the pothole. However, as illustrated in FIG. 5, a portion where the wheel spin is increased or decreased may occur. However, the different shapes when the slope of the wheel spin changes rapidly may be different depending on the model and size of the pothole.

Figure 6:
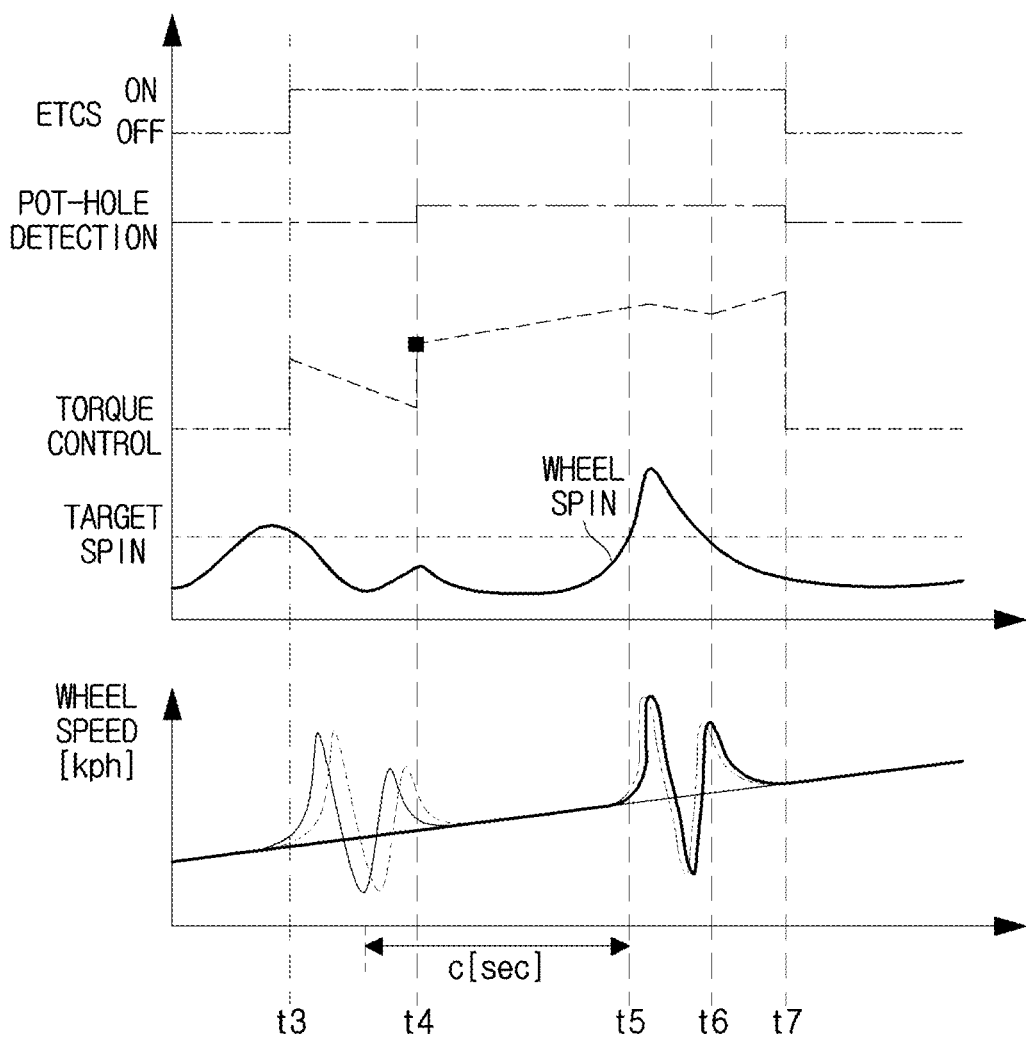
FIG. 6 is a graph for explaining the traction control method when a four-wheel drive vehicle passes over a pothole according to an embodiment.

Next, FIG. 6 illustrates the traction control method when the four-wheel drive vehicle passes over the pothole.

The two-dot chain line at the top of FIG. 6 illustrates the ON and OFF operation of the engine traction control, the one-dot chain line indicates whether the pothole is detected, the dotted line indicates the torque control, and the thick solid line indicates the wheel spin.

The bottom of FIG. 6 illustrates the wheel speed over time, the thin solid line indicates the speed of the right front wheel FR, the dotted line indicates the speed of the left front wheel FL, the thick solid line indicates the speed of the right rear wheel RR, and the two-dot chain line indicates the speed of the left rear wheel RL.

For example, FIG. 6 illustrates a state in which, during the forward travel of the four-wheel drive vehicle equipped with the vehicle control system 180 according to the present disclosure, the spin generated at the front wheel during the forward travel reaches t3 [sec] to the target spin to which the traction control can enter, and the main processor 184 may enter the engine traction control at t3 [sec].

Accordingly, the main processor 184 may confirm that the engine torque is decreased from t3 [sec] to t4 [sec]. Thereafter, when the wheel spin of the rear wheel occurs after the c [sec] time predicted by the main processor 184, it is determined that the rear wheel passes over the pothole.

Accordingly, the main processor 184 may determine that the vehicle posture is disturbed due to pothole passing and reduces only a small amount of torque from t5 [sec] to t6 [sec], and release the engine torque traction control with a steep torque rise from t6 [sec] to t7 [sec].

The configuration of the vehicle control system 180 according to the present disclosure has been described above.

Figure 7:
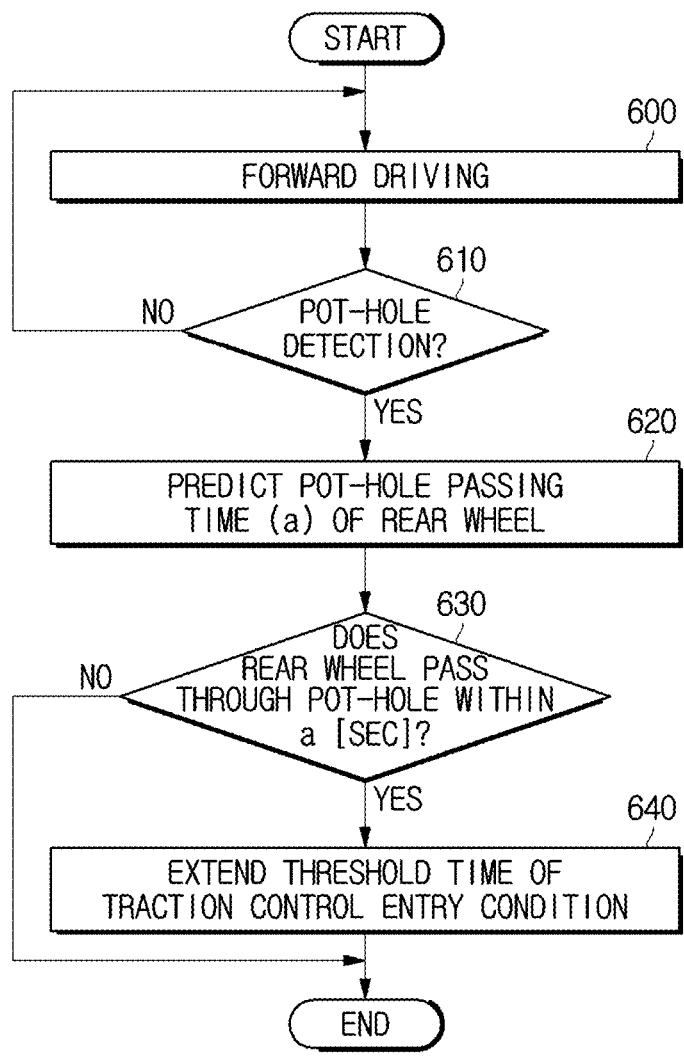
FIG. 7 is a flowchart illustrating a vehicle control method according to an embodiment.
Figure 8:
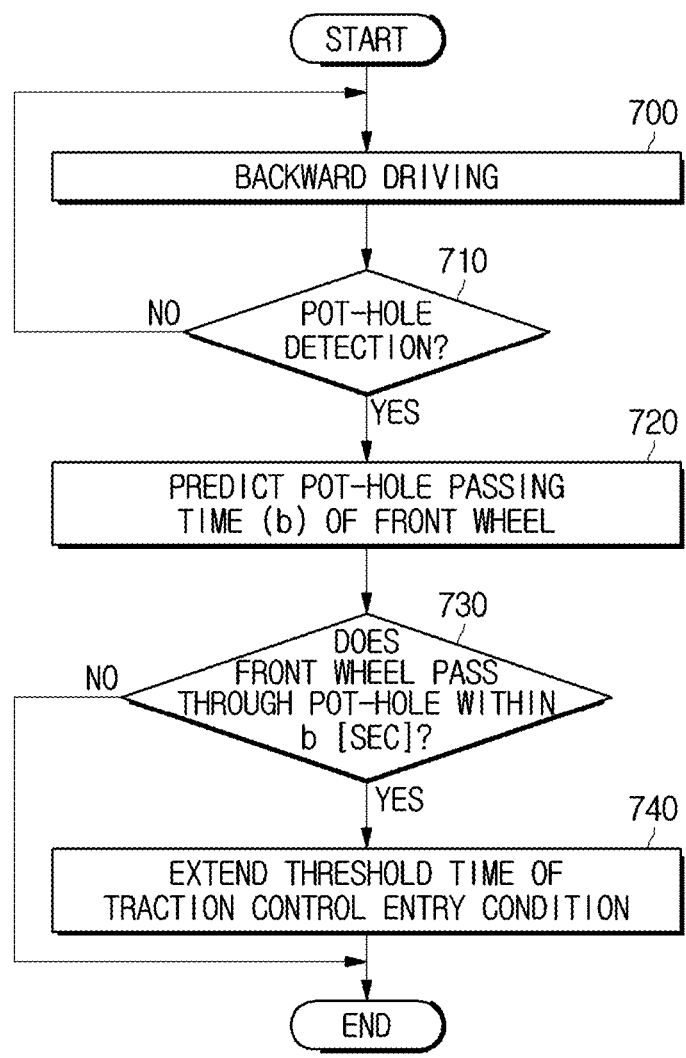
FIG. 8 is a flowchart illustrating the vehicle control method according to another embodiment.
Figure 9:
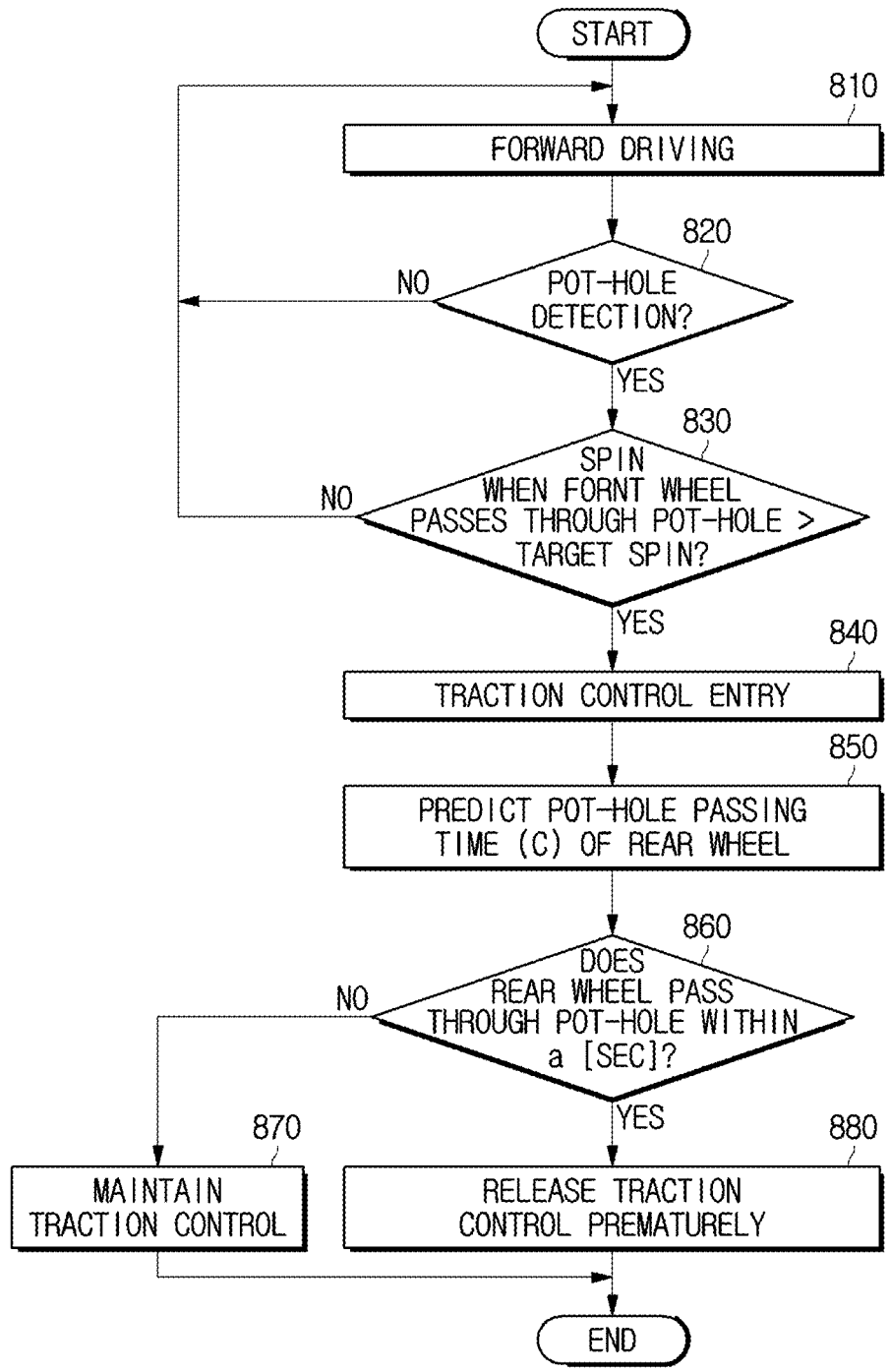
FIG. 9 is a flowchart illustrating the vehicle control method according to another embodiment.

Hereinafter, FIGS. 7 to 9 are flowcharts of a control method of the vehicle control system 180. More particularly, FIG. 7 is a flowchart illustrating a vehicle control method in the case where the pothole is passed during the forward travel of the rear-wheel drive vehicle, FIG. 8 is a flowchart illustrating a vehicle control method in the case where the pothole is passed during the backward travel of the front-wheel drive vehicle, and FIG. 9 is a flowchart illustrating a vehicle control method in the case where the four-wheel drive vehicle passes over the pothole during the forward trave. At this time, FIGS. 7 and 9 may be controlled in parallel in the rear-wheel drive vehicle or the four-wheel drive vehicle, and FIGS. 7 and 8 may be controlled in parallel in the front-wheel drive vehicle or the four-wheel drive vehicle.

As illustrated in FIG. 7, when the pothole is detected (YES in 610) during the forward travel of the vehicle (600), the vehicle control system 180 may predict the elapsed time a [sec] for the rear wheel passing over the pothole (620). In particular, the main processor 184 in the vehicle control system 180 may determine whether there is the pothole based on the wheel spin of the front wheel, and may predict a [sec], which is the elapsed time that the rear wheel passes over the pothole based on the wheel spin and the vehicle speed (630).

At this time, when the rear wheel passes over the pothole within the predicted a [sec] (YES in 630), the vehicle control system 180 may extend the threshold time of the traction control entry condition (640). That is, the vehicle control system 180 may enter the traction control when the wheel spin is maintained above the target spin longer than the threshold time during the traction control entry. As an example, the vehicle control system 180 may determine whether or not to enter the traction control after the time elapses after releasing the traction control entry for a time corresponding to the speed of the vehicle. For example, the time corresponding to the speed of the vehicle may be the predicted a [sec], which is the elapsed time for the rear wheel to pass over the pothole based on the wheel spin and the vehicle speed during the forward travel.

As illustrated in FIG. 9, when the pothole is detected (YES in 710) during the backward travel of the vehicle (700), the vehicle control system 180 may predict the elapsed time b [sec] for the front wheel passing over the pothole (720). In particular, the main processor 184 in the vehicle control system 180 may determine whether there is the pothole based on the wheel spin of the front wheel, and may predict b [sec], which is the elapsed time that the front wheel passes over the pothole based on the wheel spin and the vehicle speed (730).

At this time, when the front wheel passes over the pothole within the predicted b [sec] (YES in 730), the vehicle control system 180 may extend the threshold time of the traction control entry condition (740). That is, the vehicle control system 180 may enter the traction control when the wheel spin is maintained above the target spin longer than the threshold time during the traction control entry. As an example, the vehicle control system 180 may determine whether or not to enter the traction control after the time elapses after releasing the traction control entry for a time corresponding to the speed of the vehicle. For example, the time corresponding to the speed of the vehicle may be the predicted a [sec], which is the elapsed time for the front wheel to pass over the pothole based on the wheel spin and the vehicle speed during backward travel.

Next, FIG. 9 is a vehicle control method illustrating the case where the four-wheel drive vehicle passes over the pothole during the forward travel.

FIG. 9 illustrates the vehicle control method in the case where the traction control is entered into the wheel spin of the front wheel that has passed over the pothole first. However, the vehicle control method shown in FIG. 9 is not limited to four-wheel drive, and may be applied to rear-wheel drive or front-wheel drive.

As illustrated in FIG. 9, when the pothole is detected (YES in 820) during the forward travel of the vehicle (810), the vehicle control system 180 may enter the traction control (840) if the spin value at the front wheel passage over the pothole exceeds the target spin (YES in 830). Further, the vehicle control system 180 may predict the elapsed time c [sec] for the rear wheel passing over the pothole (850).

In particular, the main processor 184 in the vehicle control system 180 may determine whether there is the pothole based on the wheel spin of the front wheel, and may predict c [sec], which is the elapsed time that the rear wheel passes over the pothole based on the wheel spin and the vehicle speed (860).

In particular, the main processor 184 in the vehicle control system 180 may determine whether there is the pothole based on the wheel spin of the front wheel, and may predict a [sec], which is the elapsed time that the rear wheel passes over the pothole based on the wheel spin and the vehicle speed (630).

At this time, when the rear wheel passes over the pothole within the predicted c [sec] (YES in 860), the vehicle control system 180 may prematurely release the traction control (880). However, when the rear wheel does not pass over the pothole within the predicted c [sec], the vehicle control system 180 may maintain the traction control (870). In particular, in order to prematurely release the traction control, the vehicle control system 180 may drive the engine to reduce the torque reduction amount and increase the torque increase rate.

As is apparent from the above description, the vehicle control system and the control method thereof according to the embodiments of the present disclosure can prevent the unnecessary entry of the TCS.

Therefore, the embodiment of the present disclosure can provide an efficient TCS system that secures the riding comfort desired by the driver and prevents the unnecessary control of the engine torque by preventing the unnecessary entry of the TCS.

Although an embodiment of the present disclosure has been illustrated and described, the present disclosure may not be limited to the above-described specific embodiment and various changes may be made in the embodiment by those skilled in the art without departing from the scope and spirit of the present disclosure defined by the appended claims, and such modifications may not be individually understood from the present disclosure.

What is claimed is:

1. A vehicle control system comprising:
an inputter configured to receive a wheel speed of a vehicle; and
a controller configured to determine a wheel spin based on the wheel speed, determine whether the vehicle passes over a pothole based on the tendency of the wheel spin, and calculate time for delaying start of engine traction control based on the wheel speed and delay the start of the engine traction control for the time calculated based on the wheel speed when it is determined that the vehicle passes over the pothole.

2. The vehicle control system according to claim 1, wherein the controller is configured to prematurely release the engine traction control when the vehicle passes over the pothole after the engine traction control is started.

3. The vehicle control system according to claim 1, wherein the controller is configured to determine whether the vehicle passes the pothole based on the tendency of the wheel spin of a front wheel during forward travel of the vehicle, and then delay the start of the engine traction control for the time calculated based on the wheel speed when it is determined that a rear wheel passes over the pothole.

4. The vehicle control system according to claim 1, wherein the controller is configured to determine whether the vehicle passes over the pothole based on the tendency of the wheel spin of a rear wheel during backward travel of the vehicle, and then delay the start of the engine traction control for the time calculated based on the wheel speed when it is determined that a front wheel passes over the pothole.

5. The vehicle control system according to claim 2, wherein the controller is configured to prematurely release the engine traction control when it is determined that the vehicle passes over the pothole based on the wheel spin of a rear wheel after the start of the engine traction control based on the tendency of the wheel spin of a front wheel, or when it is determined that the vehicle passes over the pothole based on the tendency of the wheel spin of the front wheel after the start of the engine traction control based on the wheel spin of the rear wheel.

6. The vehicle control system according to claim 5, wherein the controller is configured to prematurely release the engine traction control by increasing the engine torque increase rate.

7. The vehicle control system according to claim 6, wherein the controller is configured to prematurely release the engine traction control by increasing the engine torque increase rate after reducing the engine torque to a minimum upon passage over an additional pothole after the start of the engine traction control.

8. The vehicle control system according to claim 6, wherein the controller is configured to determine that the vehicle is passing over the pothole when an increase or decrease of the wheel spin for a predetermined time is more than a predetermined value according the tendency of the wheel spin formed within the predetermined time.

9. A vehicle control method comprising:
receiving a wheel speed of a vehicle;
determining a wheel spin based on the wheel speed;
determining whether the vehicle passes over a pothole based on the tendency of the wheel spin; and
when it is determined that the vehicle passes over the pothole, calculating time for delaying start of engine traction control based on the wheel speed and delaying the start of engine traction control for the time calculated based on the wheel speed.

10. The method according to claim 9, further comprising:
when the vehicle passes over the pothole after the engine traction control is started, prematurely releasing the engine traction control upon passage over the pothole.

11. The method according to claim 9, wherein the delaying of the engine traction control comprises:
determining whether the vehicle passes over the pothole based on the wheel spin of a front wheel during forward travel of the vehicle and then delaying the start of the engine traction control for the time calculated based on the wheel speed when it is determined that a rear wheel passes over the pothole or determining whether the vehicle passes over the pothole based on the wheel spin of the rear wheel during backward travel of the vehicle, and then delaying the start of the engine traction control for the time calculated based on the wheel speed when it is determined that the front wheel passes over the pothole.

12. The method according to claim 10, wherein the prematurely releasing of the engine traction control comprises:
prematurely releasing the engine traction control when it is determined that the vehicle passes over the pothole based on the wheel spin of a rear wheel after the start of the engine traction control based on the tendency of the wheel spin of a front wheel, or when it is determined that the vehicle passes over the pothole based on the tendency of the wheel spin of the front wheel after the start of the engine traction control based on the wheel spin of the rear wheel.

13. The method according to claim 12, further comprising:
prematurely releasing the engine traction control by increasing the engine torque increase rate.

14. The method according to claim 13, further comprising:
prematurely releasing the engine traction control by increasing the engine torque increase rate after reducing the engine torque to a minimum upon passage over an additional pothole after the start of the engine traction control.

15. The method according to claim 9, wherein the determining of whether the vehicle passes over the pothole based on the tendency of the wheel spin comprises:
determining that the vehicle is passing over through the pothole an increase or decrease of the wheel spin for a predetermined time is more than a predetermined value according the tendency of the wheel spin formed within the predetermined time.

\* \* \* \* \*